United States Patent
Bent et al.

(10) Patent No.: US 9,716,649 B2
(45) Date of Patent: Jul. 25, 2017

(54) PROPAGATING A QUERY IN A NETWORK

(71) Applicant: INTERNATIONAL BUSINESS MACHINES CORPORATION, Armonk, NY (US)

(72) Inventors: Graham A. Bent, Southampton (GB); Thomas J. C. Berman, London (GB); Patrick Dantressangle, Chandler's Ford (GB); David R. Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 14/082,821

(22) Filed: Nov. 18, 2013

(65) Prior Publication Data
US 2016/0359724 A1 Dec. 8, 2016

(30) Foreign Application Priority Data
Dec. 6, 2012 (GB) .................................. 1221940.8

(51) Int. Cl.
*H04L 29/06* (2006.01)
*H04L 12/721* (2013.01)
(Continued)

(52) U.S. Cl.
CPC ...... *H04L 45/124* (2013.01); *G06F 17/30566* (2013.01); *G06F 17/30864* (2013.01);
(Continued)

(58) Field of Classification Search
None
See application file for complete search history.

(56) References Cited

U.S. PATENT DOCUMENTS 5,987,440 A * 11/1999 O'Neil ................... G06Q 10/10
                                                              705/39
6,366,915 B1   4/2002 Rubert et al.
(Continued)

FOREIGN PATENT DOCUMENTS

WO        03107223 A1    12/2003

OTHER PUBLICATIONS

Zhang, Xian; Liu, Yang; Aguston, Mikhail. Modeling and Analyzing Timed Security Protocols Using Extended Timed CSP. 2010 Fourth International Conference on Secure Software Integration and Reliability Improvement (SSIRI). http://ieeexplore.ieee.org/stamp/stamp.jsp?arnumber=5502836.*

(Continued)

*Primary Examiner* — Jeremiah Avery
(74) *Attorney, Agent, or Firm* — Law Office of Jim Boice (57) ABSTRACT

A query is propagated from a querying node to a destination node in a network of connected nodes, where at least one node is designated as a delay node. A query is transmitted from the querying node to one or more connected nodes in the network of connected nodes. One or more nodes, from the one or more connected nodes, are designated as delay nodes, wherein delay nodes apply delays to the query before retransmitting the query to other nodes from the one or more connected nodes. Upon receiving the query, each node, from the one or more connected nodes, retransmits the query to another one or more nodes from the one or more connected nodes. The query is repeatedly received and retransmitted by the connected nodes until the query is received at the destination node.

12 Claims, 5 Drawing Sheets

(51) Int. Cl.
*G06F 17/30* (2006.01)
*H04L 12/751* (2013.01)
*H04L 29/08* (2006.01)

(52) U.S. Cl.
CPC ............ *H04L 45/02* (2013.01); *H04L 63/062* (2013.01); *H04L 67/10* (2013.01)

(56) References Cited

U.S. PATENT DOCUMENTS

| | | | |
|---|---|---|---|
| 6,640,238 B1* | 10/2003 | Bowman-Amuah ... | G06F 9/541 709/201 |
| 7,376,827 B1* | 5/2008 | Jiao .................. | H04L 29/12066 370/351 |
| 7,457,279 B1* | 11/2008 | Scott ...................... | H04L 45/02 370/352 |
| 7,984,294 B1 | 7/2011 | Goringe et al. | |
| 8,055,913 B2* | 11/2011 | Ginter .................... | G06F 21/10 705/51 |
| 8,139,588 B2 | 3/2012 | Hardjono et al. | |
| 8,144,875 B2* | 3/2012 | McGough ............ | H04L 63/061 280/278 |
| 8,145,652 B2 | 3/2012 | Bent et al. | |
| 8,250,140 B2 | 8/2012 | Bent et al. | |
| 8,925,059 B2* | 12/2014 | Mackler .................. | G06F 21/31 709/227 |
| 2003/0145105 A1* | 7/2003 | Desineni ............. | H04L 12/2697 709/238 |
| 2005/0166040 A1* | 7/2005 | Walmsley ............ | B41J 2/04505 713/150 |
| 2008/0059405 A1 | 3/2008 | Barsness et al. | |
| 2008/0072035 A1* | 3/2008 | Johnson ............. | H04L 63/0428 713/153 |
| 2008/0172172 A1 | 7/2008 | Ng | |
| 2009/0077036 A1 | 3/2009 | Bent et al. | |
| 2009/0252161 A1* | 10/2009 | Morris .................. | H04L 45/124 370/389 |
| 2010/0037056 A1* | 2/2010 | Follis .................. | G06F 11/1464 713/171 |
| 2011/0047256 A1* | 2/2011 | Babu ................. | H04L 29/12367 709/223 |
| 2013/0157699 A1* | 6/2013 | Talwar .................... | H04L 51/38 455/466 |

OTHER PUBLICATIONS

Kim, Myongsoo; Metzner, John J. A Key Exchange Method for Intelligent Electronic Devices in Distribution Automation. IEEE Transactions on Power Delivery. vol. 25, Issue: 3. Pub. Date: 2010. http://ieeexplore.ieee.org/stamp/stamp.jsp?arnumber=5491357.*

Pu, Liu. An Improved Short Message Security Protocol for Home Network. International Conference on Future Computer and Communication. Pub. Date: 2009. http://ieeexplore.ieee.org/stamp/stamp.jsp?arnumber=5235706.*

GB Patent Application No. 1221940.8—UK IPO Search Report Mailed Jun. 7, 2013.

Anonymous, "Gaian Database: The Data Virtualization Engine for the Edge of the Network", IBM, <https://www.ibm.com/developerworks/community/groups/service/html/communityview?communityUuid=f6ce657b-f385-43b2-8350-458e6e4a344f >, Retrieved Nov. 18, 2013, pp. 1-3.

Li et al, "Trust-Based on-Demand Multipath Routing in Mobile Ad Hoc Networks", IET Information Security, vol. 4, No. 4, Dec. 2010, pp. 1-22.

Jassim et al., "A Routing Protocol Based on Trusted and Shortest Path Selection for Mobile Ad Hoc Network", 2009 IEEE 9th Malaysia International Conference on Communications (MICC), 2009, pp. 547-554 (Abstract Only).

Li et al., "Dependable Propagating Routing Information in Manet", Lecture Notes in Computer Science, 2005, vol. 3619/2005, 772-780 (Abstract Only).

* cited by examiner

PROPAGATING A QUERY IN A NETWORK

STATEMENT REGARDING FEDERALLY SPONSORED RESEARCH OR DEVELOPMENT

This invention was made with Government support under Contract Number W911NF-06-3-0001 awarded by the United States Army. The Government has certain rights to this invention.

This application is based on and claims the benefit of priority from United Kingdom (GB) Patent Application 1221940.8, filed on Dec. 6, 2012, and herein incorporated by reference in its entirety.

BACKGROUND

This invention relates to a method of, and system for, propagating a query in a network of connected nodes. In one embodiment, the invention provides a method to dynamically route information through the fastest most trusted path in a network.

A federated database is made up of a number of interconnected database management systems (DBMSs), each of which manages one or more databases. The federated database allows a single query to access the databases through the interconnected DBMSs. In one known method of propagating a query in a federated database, the query is received by the federated database and propagated over connections between the various DBMSs. DBMSs that control databases targeted by the query then translate the query into actions that are compatible with the databases they control. As the size of a database federation increases, various scaling problems can occur. For example, as new DBMSs are added to the federated database, the number of connections between the DBMSs may increase in a combinatorial fashion. This can lead to an unwieldy number of connections in a federated database that contains only a moderate number of DBMSs. Further, the network topology of the federated database may also lead to data that is inaccessible following the failure of a connection or DBMS. Additionally, when a query is made to the database federation, the communication overhead in distributing the query to all of the DBMSs can be significant. Various methods of propagating queries are known in the prior art.

In the operation of a Dynamic Distributed Federated Database (DDFD), where distributed data sources are federated across a network of inter-connected self-organizing DDFD nodes, it may be that, in such networks, the route selected to propagate a query is not the best, for other reasons. For example, the data sources and DDFD nodes may be owned by different organizations some of which may be trusted (in some sense) while others may be non-trusted. The routing of queries and their replies through non-trusted nodes is a significant problem in that there is a desire to find the quickest route between nodes, but data must ideally not travel through non-trusted nodes.

In static networks, which are not changing rapidly, a trivial solution to this problem is to centrally determine the structure of the network and to compute the path(s) that minimize the distance between the querying node and the data source(s) via the minimum number of non-trusted nodes. A node from which a query is to be launched could query this central system, asking if the data can be sent through a certain path. This central system can hold policy for all of the nodes and their interaction. This approach is not appropriate in the case of a DDFD, due to the dynamic and self-organizing nature of such systems, which means that there is no central system that maintains information about the network topology.

SUMMARY

In one embodiment of the present invention, a method propagates a query from a querying node to a destination node in a network of connected nodes, where at least one node is designated as a delay node. A query is transmitted from the querying node to one or more connected nodes in the network of connected nodes. One or more nodes, from the one or more connected nodes, are designated as delay nodes, wherein delay nodes apply delays to the query before retransmitting the query to other nodes from the one or more connected nodes. Upon receiving the query, each node, from the one or more connected nodes, retransmits the query to another one or more nodes from the one or more connected nodes. The query is repeatedly received and retransmitted by the connected nodes until the query is received at the destination node.

In one embodiment of the present invention, a system for propagating a query comprises: a hardware querying node, wherein the hardware query node transmits a query; one or more hardware connected nodes communicatively coupled to the hardware querying node; one or more hardware delay nodes, wherein the one or more hardware delay nodes are nodes from the one or more hardware connected nodes that have been designated to apply delays to the query before retransmitting the query to other nodes from the one or more hardware connected nodes; and a hardware destination node communicatively coupled to the one or more hardware nodes, wherein the one or more connected nodes receive the query from the hardware querying node, wherein: the query is received at each node from the one or more connected nodes; in response to each node, from the one or more connected nodes, receiving the query for a first time, each node retransmits the query to another one or more nodes from the one or more connected nodes; and the query is repeatedly received and retransmitted at other nodes from the one or more connected nodes until the query is received at the destination node.

In one embodiment of the present invention, a computer program product propagates a query from a querying node to a destination node in a network of connected nodes, wherein at least one node is designated as a delay node. The computer program product comprises a computer readable storage medium having program code embodied therewith, the program code readable and executable by a processor to perform a method comprising: transmitting the query from the querying node to one or more connected nodes in the network of connected nodes; designating one or more nodes, from the one or more connected nodes, as delay nodes, wherein the delay nodes apply delays to the query before retransmitting the query to other nodes from the one or more connected nodes; receiving the query at each node from the one or more connected nodes; in response to the each node, from the one or more connected nodes, receiving the query for a first time, each node retransmitting the query from each node to another one or more nodes from the one or more connected nodes; and repeatedly receiving and retransmitting the query at other nodes from the one or more connected nodes until the query is received at the destination node.

BRIEF DESCRIPTION OF THE SEVERAL VIEWS OF THE DRAWINGS

Illustrative embodiments of the present invention will now be described, by way of example only, with reference to the following drawings, in which.

DETAILED DESCRIPTION

Figure 1:
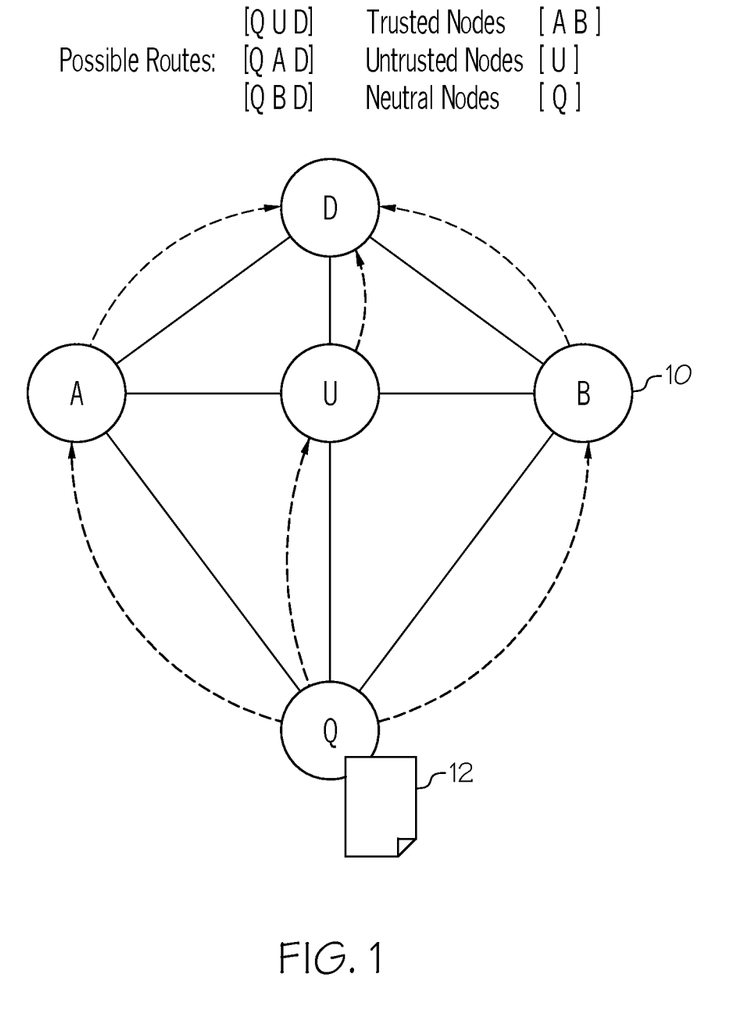
FIG. 1 is a schematic diagram of a network of connected nodes.

FIG. 1 shows an example of a network of connected nodes 10. Each node 10 in the network is connected to one or more nodes 10 of the network. A query 12 is to be propagated from a querying node Q to a destination node D. The network of FIG. 1 is a federated database, which is made up of a number of interconnected databases. The federated database allows a single query to access the databases through the interconnected nodes. The query is received or generated by a node of the federated database and propagated over connections between the various nodes. Whilst the invention is described in the context of a Dynamic Distributed Federated Database (DDFD), the propagation method can be applied to other types of peer-to-peer information sharing networks.

FIG. 1 illustrates a simple example of the problem of propagating queries in the network. Node Q wishes to retrieve data from node D of the network. Lying between node Q and node D are three nodes labelled A, U and B, through which the data from node D will be returned. Node D wishes to have control over the nodes that have access to the data that is being returned to node Dynamic Distributed Federated Database. In this example, node U is not trusted and is therefore a potential hostile party or at least a node that has not been verified in some sense. Although the network illustrated in FIG. 1 is small and not complicated, in practical systems, there will be a very large number of nodes with a complex network of connections between nodes.

An example of a distributed federated database is GaianDB. In GaianDB, a query would be broadcast from node Q to nodes A, U and B and the route (via A, U or B) which arrives fastest at node D will be the path on which the data is returned. As node U may well be the fastest route, this could result in sending data through hostile or insecure nodes, thereby compromising security. The proposed method of propagating the query 12 determines the shortest most trusted path using a distributed time delay mechanism that is applied by each node in the network and does not require any knowledge of the rest of the network or even the adjacent nodes.

A query 12 issued by any node 10 in the network propagates through the network using a "controlled flood" mechanism, in which nodes propagate the query to other nodes if the same query has not already reached the node via a faster route within the network. This results in the fastest path between the query node and the data source that can respond to the query being discovered and the data is routed back to the querying node over the shortest path. The query may result in data being provided by more than one node in the network (if no single node has all the data requested), in which case each replying node that is transmitting a reply will send that reply back on the path taken by the query to that specific replying node.

Figure 2:
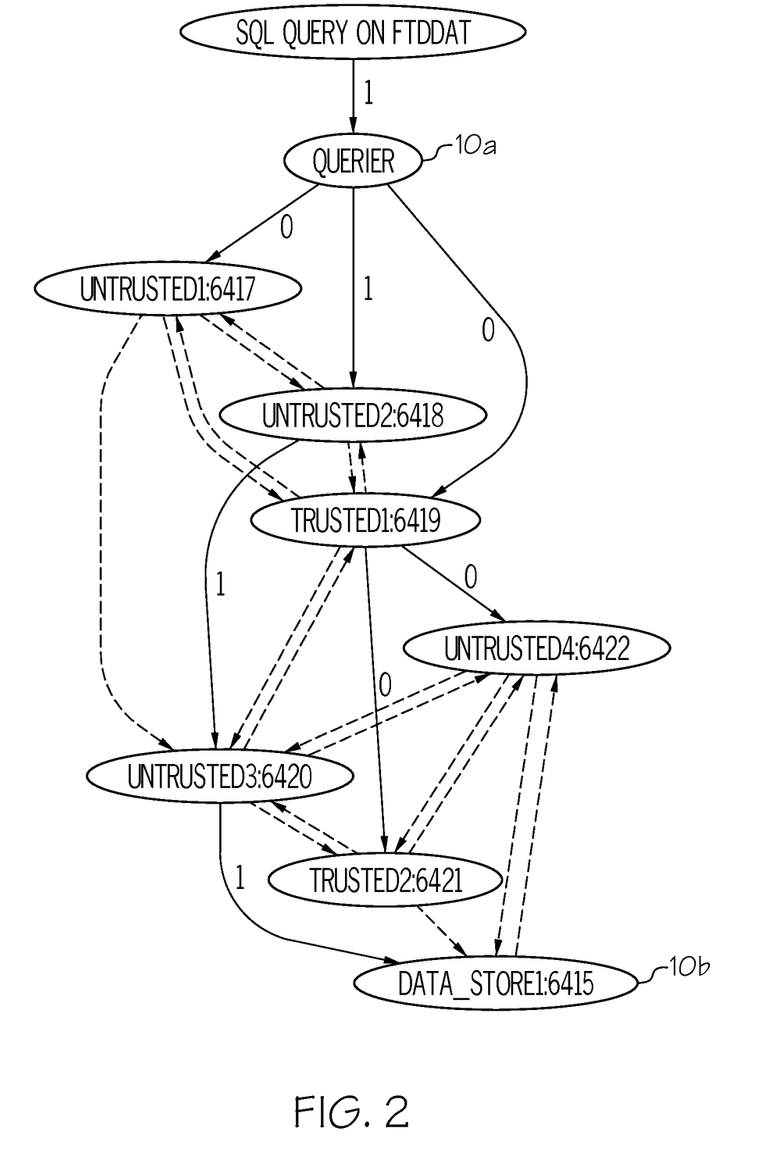
FIG. 2 is a schematic diagram of a different network of connected nodes.

This is illustrated in FIG. 2, where a querying node 10a has propagated a query to a destination node 10b. The solid lines between nodes show the paths that indicate the quickest path of the query to that particular node and the numbers next to a solid path show the number of records returned over each path. The dashed lines, which can be referred to as cross talk, show the last hop of a query that arrives at a node over a slower path and is not propagated any further. This cross talk is the suppression mechanism that results in the controlled flood query. In this example the shortest path is through non-trusted or "untrusted" nodes, as no delay is applied in the propagation process.

The propagation of the query in the network is improved by making use of the cross talk mechanism by delaying the propagation of queries that pass through untrusted nodes whilst propagating queries through other nodes with a minimal delay. Each non-trusted nodes is designated as a delay node. Once a query has begun to be propagated, the more untrusted nodes in a network that a query has to traverse, the greater will be the accumulated delay along that path. During this delay, the cross talk from nodes that lie along the trusted path rapidly suppresses the delayed queries resulting in the establishment of the fasted trusted path(s) between the querying node and the data source(s). A delay is applied prior to a query being retransmitted from each of the non-trusted nodes, which are the nodes that are designated as delay nodes.

Figure 3:
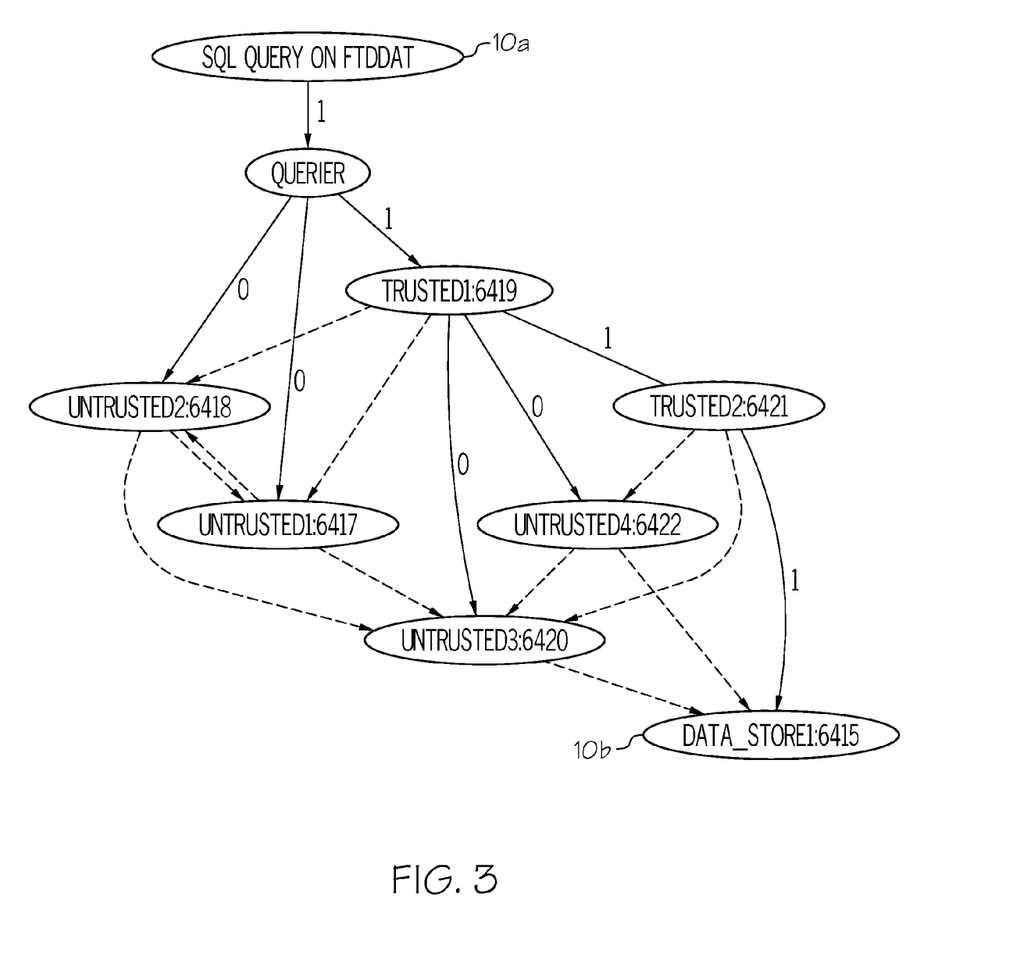
FIG. 3 is a schematic diagram of the network of FIG. 2, showing a different query routing.

The query routing works by artificially inserting time delays at nodes if they are not trusted, ensuring that the path with the most trusted nodes is the quickest to reach the node with the data and thus ensuring it is the path on which the data returns. FIG. 3 shows the network of FIG. 2, where the routing of the query from the querying node 10a to the destination node 10b, uses the delaying factor at any non-trusted node (where in FIG. 2 no delay is applied). It can be seen that in the FIG. 3 propagation, the quickest route to the destination node 10b is via the trusted nodes 6419 and 6421.

Each node in the network that receives the query retransmits the query to one or more connected nodes, the first time that the query is received at the specific node. The non-trusted nodes, however, apply a delay before the retransmission, which means that the query slows down on these routes. In FIG. 2, the quickest route was via nodes 6418 and 6420, but both of these nodes are non-trusted and so, when a delay is applied as per FIG. 3, the route via the trusted nodes 6419 and 6421 propagates the query to the destination node 10b the quickest. In complex networks, where there are multiple different trusted routes to the destination node 10b, the fastest route will still be selected between the different trusted alternatives.

Various mechanisms can be used to determine if a node is trusted or untrusted. In one embodiment of the invention each query has an associated encrypted token that is sent with the query. Each node the query arrives at attempts to decrypt the token. If the node is able to decrypt the token, it re-encrypts the token and passes on the query. If however, the node is not able to decrypt the token, it waits for a specified amount of time then passes on the query. Encryption keys are distributed out-of-band before the system is started. This ensures that only the trusted nodes will allow the query to propagate to other nodes without a delay being first applied.

In a network comprising nodes containing a mixture of trusted and untrusted nodes, the path from the querying node to the destination node, then in general, the data will be returned using a route containing only trusted nodes. If there is no path of trusted nodes through the network from the querying node to the destination node, then the route will be via the fastest path containing the minimum number of untrusted nodes. If data is being returned from more than one node, then it is possible that some of the data will travel via a trusted route and some will travel via an untrusted route, but the methodology will always minimize the number of untrusted nodes used in the return journey.

It is recognized that the method will incur the cost of an increased query time due to the propagation delay that occurs at the untrusted nodes. However, this time is constrained by cross talk. In many cases the maximum time for a query to be executed using the method described depends on the summation of two factors, firstly the maximum time delay along the most trusted path(s) and secondly, the maximum time delay of an untrusted node from any node along the most trusted path(s). In general, for the increased security of using only trusted nodes, the slightly slower propagation of the original query is a price considered worth accepting.

In the case of a large network, in general, the maximum separation of any two nodes is the diameter of the node graph which scales logarithmically with the number of nodes. The time delay can be further reduced by killing the query after a time proportional to the time delay through an untrusted node and accepting the result set returned. In this case a normal propagation will result that will mean that the fastest route will be selected, regardless of the presence of untrusted nodes in the route. However, this may be considered more practical, if a very large time delay is being introduced into a query that is propagated solely through trusted nodes.

Figure 4:
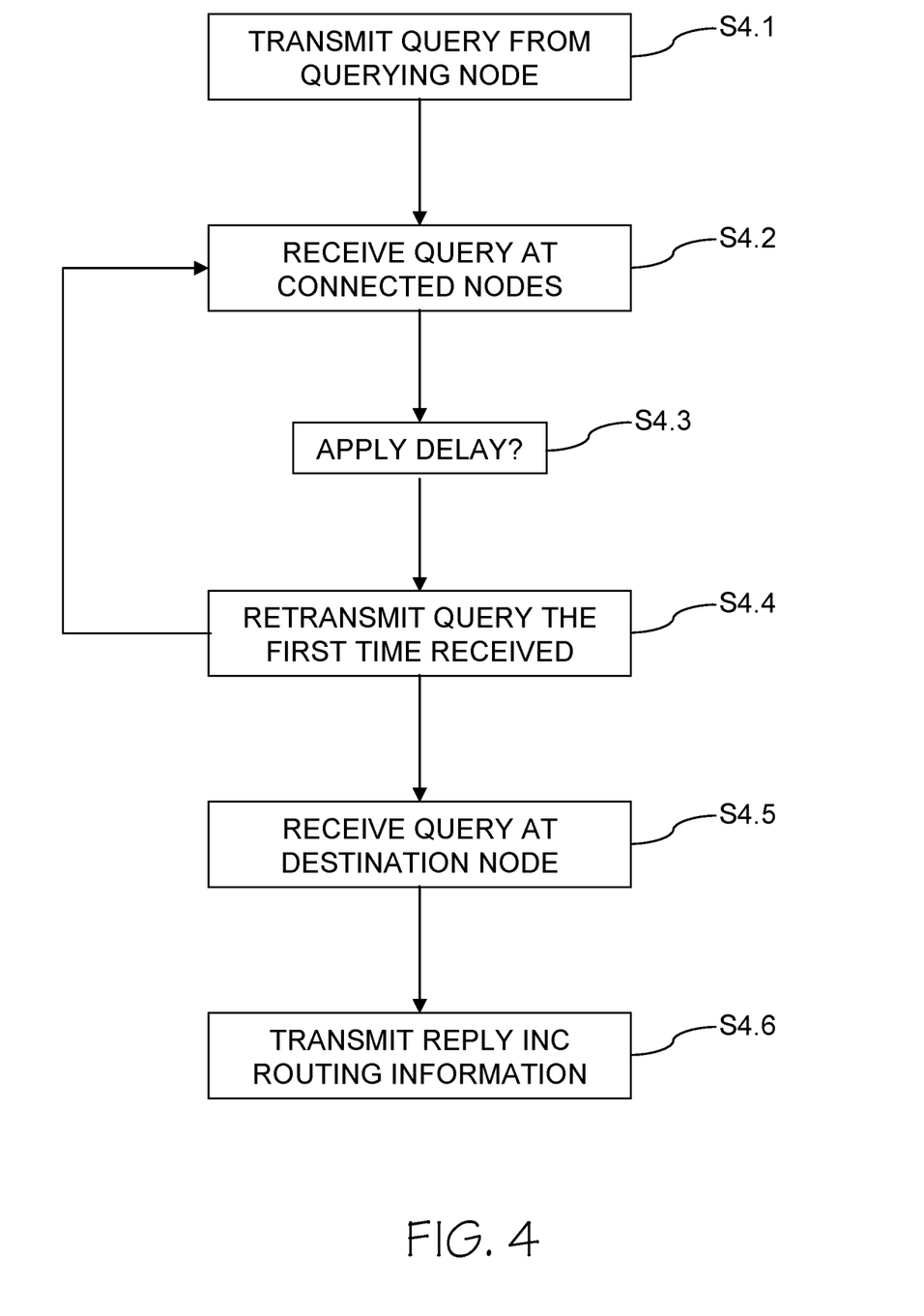
FIG. 4 is a flowchart of a method of propagating a query in a network.

FIG. 4 shows a flowchart summarizing the method of propagating a query from a querying node to a destination node in a network of connected nodes, where at least one node is designated as a delay node. The method comprises the steps of, firstly step S4.1, which comprises transmitting the query from the querying node to one or more connected nodes. In general, the querying node will transmit the query to all of its connected nodes, as this has the greatest likelihood of discovering the quickest route to the destination node. The next step is step S4.2, which comprises receiving the query at the one or more connected nodes.

At step S4.3, a delay is applied if the receiving node is designated as a delay node. At step S4.4, each node receiving the query retransmits the query to one or more connected nodes (usually all) the first time only that the query is received at the node. As the query is received by any node, that node will retransmit the query to other nodes, as long as it is the first time that the specific node has seen that query. These steps, S4.2, S4.3 and S4.4 are repeated so that each node receiving the query receives and retransmits of the query (first time only), until the query reaches the destination node. Each node that is designated as a delay node, following receipt of the query, applies, at step S4.3, a delay prior to retransmitting the query to one or more connected nodes.

The next step is step S4.5, which comprises receiving the query at the destination node, and finally the method terminates at step S4.6, which comprises transmitting a reply to the query from the destination node, the reply including the requested data and routing information defining the route of the query from the querying node to the destination node. In this way the route taken by the query from the querying node to the destination node is used as the return route for the data being sent back to the querying node. The fastest, most trusted route has been discovered by the process and this route is utilized for the data being returned to the original querying node.

A node can be designated as a delay node for one or more reasons. In one embodiment, whether a node is considered to be "non-trusted" determines whether such a node is designated as a delay node. The node designation may be based on other criteria such as reliability, bandwidth and/or other node attributes. A network bandwidth embodiment would be to plug-in and apply a delay function based on network bandwidth, for example based on a maximum historically measured throughput. The delay that is applied at the nodes need not be the same delay at all the nodes that are designated as delay nodes. The actual size of the delay could reflect a function of the attribute being used.

Figure 5:
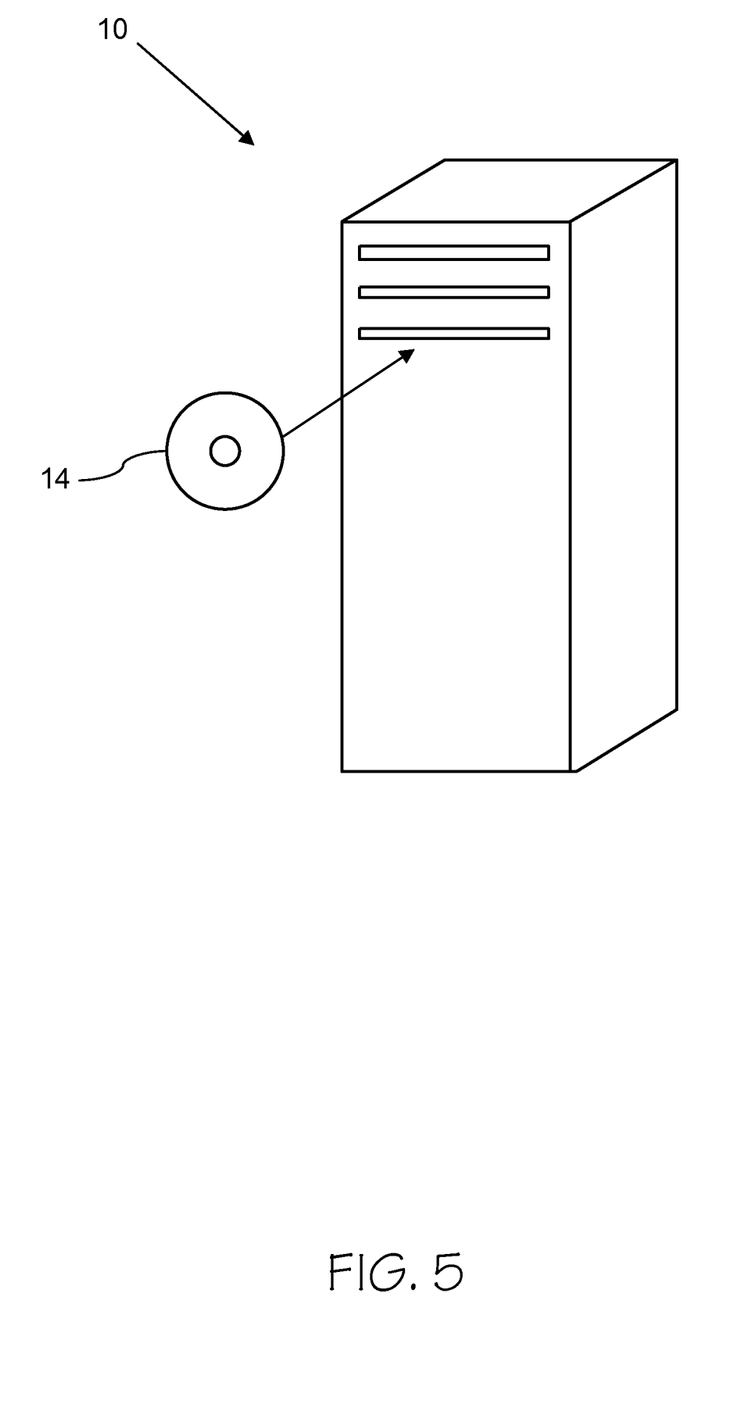
FIG. 5 is a schematic diagram of a node of a network of connected nodes.

A single node is illustrated in FIG. 5, which comprises a server 10 which is controlled by a computer program product stored on a computer readable medium 14. The computer program product comprises instructions for controlling the operation of the server 10 and the server 10 executes these instructions to perform the propagation of queries that are received. The server 10 is running a database that is part of a larger network of disparate databases that are stored on the network of which the server 10 of FIG. 5 is one node. The propagation and the addition of the delay, if the server 10 is designated as a delay node, are controlled by the computer program product on the medium 14.

When a query is received by the server 10 for the first time, then the server 10 will propagated that query onwards to all of its connected nodes (assuming that the server 10 is not the destination for the query). If the server 10 is designated as a delay node (for example since it is a non-trusted node) then a delay will be applied before there is any retransmission of the received query. The server 10 is not aware of the overall structure of the network of connected nodes and acts independently of the actions taken by other nodes. In practice, all of the nodes in the network will operate in the same way, applying a delay if they are designated as delay nodes (for whatever reason).

According to a first aspect of the present invention, there is provided a method of propagating a query from a querying node to a destination node in a network of connected nodes, at least one node designated as a delay node, the method comprising the steps of transmitting the query from the querying node to one or more connected nodes, receiving the query at one or more connected nodes, each node receiving the query, retransmitting the query to one or more connected nodes, the first time that the query is received at the node, repeating the receiving and retransmitting of the query for each node receiving the query, and receiving the query at the destination node, wherein at each node designated as a delay node, following receipt of the query, applying a delay prior to retransmitting the query to one or more connected nodes.

According to a second aspect of the present invention, there is provided a system for propagating a query from a querying node to a destination node in a network of connected nodes, at least one node designated as a delay node, the system arranged to transmit the query from the querying node to one or more connected nodes, receive the query at one or more connected nodes, each node receiving the query, retransmitting the query to one or more connected nodes, the first time that the query is received at the node, repeat the receiving and retransmitting of the query for each node receiving the query, and receive the query at the destination node, wherein at each node designated as a delay node, following receipt of the query, there is applied a delay prior to retransmitting the query to one or more connected nodes.

According to a third aspect of the present invention, there is provided a computer program product on a computer readable medium for propagating a query from a querying node to a destination node in a network of connected nodes, at least one node designated as a delay node, the product comprising instructions for transmitting the query from the querying node to one or more connected nodes, receiving the query at one or more connected nodes, each node receiving the query, retransmitting the query to one or more connected nodes, the first time that the query is received at the node, repeating the receiving and retransmitting of the query for each node receiving the query, and receiving the query at the destination node, wherein each node designated as a delay node, following receipt of the query, applies a delay prior to retransmitting the query to one or more connected nodes.

Owing to the invention, it is possible to provide a method to dynamically discover the shortest path between a querying node and the data sources that can respond to the issued query, while minimizing the number of nodes designated as delay nodes, which could be non-trusted nodes, and the shortest most trusted path is the path that minimizes the time delay between the querying node and the data source whilst passing through the minimum number of non-trusted nodes, which is ideally zero non-trusted nodes. The method has the advantage over other known solutions in that it is fully distributed where each node performs the same actions, it does not rely upon a node having any knowledge of the network structure, it is scalable to networks of any size and is simple to implement.

As the query propagates through the network of nodes, each node will retransmit the first copy of the query that they receive to one or more connected nodes (in one embodiment to all of their connected nodes), while any node designated as a delay node will delay this retransmission. This means that the path of the query through the nodes slows down in the nodes designated as delay nodes and so will find the quickest route through the network that minimizes the passage through any delay nodes. The reply to the query is then routed back through this quickest, route. There is no guarantee that no nodes designated as delay nodes will be present in the route selected, but the number of such nodes in the route will have been minimized and if there is a route through the network that does not contain any delay nodes, then this methodology is highly likely to find that route through only the non-delay nodes.

In one embodiment of the present invention, the query includes an encryption token and each node that receives the query attempts to decrypt the encryption token and applies a delay prior to retransmitting the query if the decryption fails. The query being propagated through the network can have an encryption token as part of the query. This provides a mechanism by which the delay can be implemented in the nodes that are not trusted. Those nodes that are unable to decrypt the encryption token will apply the delay to the query before they retransmit the query to the nodes that are connected to that non-trusted node. Other encryption type schemes can be used, with the necessary encryption keys being transmitted to the trusted nodes outside of the query propagation mechanism.

Advantageously, the delay applied to retransmitting the query to one or more connected nodes from a node designated as a delay node comprises an integer multiple of the normal transmission time between connected nodes. The delay applied to the retransmission of the query by nodes designated as delay nodes can be set as an integer multiple of the normal transmission time between nodes in the network. The integer may be 3, for example, although any suitable number can be used. This ensures that a realistic delay is applied at the nodes designated as delay nodes, without an exceptionally large delay being created, in case there are ultimately one or more delay nodes in path to the destination node. In this latter case, it is important not to add too much time to the time taken by the query on the way to the destination node.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of propagating a query from a querying node to a destination node in a network of connected nodes, wherein the query includes an encryption token, wherein the network of connected nodes comprises at least one node designated as a delay node, wherein certain nodes in the network of connected nodes have been predetermined to be untrusted nodes, wherein the network of connected nodes is a network of hardware nodes, and wherein the method comprises:
   transmitting, by one or more processors, the query from the querying node to one or more connected nodes in the network of connected nodes;
   designating one or more nodes, from said one or more connected nodes, as delay nodes, wherein only untrusted nodes are designated as the delay nodes, and wherein said delay nodes apply delays to the query before retransmitting the query to other nodes from said one or more connected nodes;
   receiving, by one or more processors, the query from one or more of the delay nodes at each node from said one or more connected nodes;
   in response to said each node, from said one or more connected nodes, receiving the query for a first time, said each node retransmitting the query from said each node to another one or more nodes from said one or more connected nodes;
   attempting, by each node that receives the query, to decrypt the encryption token;
   designating, by one or more processors, each node that fails to decrypt the encryption token as one of the untrusted nodes that are required to apply a delay to the query prior to retransmitting the query to another node in the network of connected nodes; and
   repeatedly receiving and retransmitting the query at other nodes from said one or more connected nodes until the query is received at the destination node.

2. The method according to claim 1, further comprising:
   preventing, by one or more processors, any delay in retransmitting the query through trusted nodes in the network of connected nodes that contain an encryption key for decrypting an encryption token that accompanies the query.

3. The method according to claim 1, further comprising;
   transmitting a reply to the query from the destination node, the reply including routing information defining a route of the query from the querying node to the destination node.

4. The method according to claim 1, wherein a delay applied to retransmitting the query to one or more connected nodes from a node designated as a delay node comprises an integer multiple of a normal transmission time between connected nodes.

5. A system for propagating a query, the system comprising:
- a hardware querying node, wherein the hardware querying node transmits a query;
- one or more hardware connected nodes communicatively coupled to the hardware querying node;
- one or more hardware delay nodes, wherein said one or more hardware delay nodes are nodes from said one or more hardware connected nodes that have been designated to apply delays to the query before retransmitting the query to other nodes from said one or more hardware connected nodes, and wherein certain hardware nodes in the network of connected nodes have been predetermined to be untrusted hardware nodes, and wherein only the untrusted hardware nodes are designated as the hardware delay nodes; and
- a hardware destination node communicatively coupled to said one or more hardware connected nodes, wherein said one or more hardware connected nodes receive the query from the hardware querying node, and wherein:
  - the query is received from one or more of the hardware delay nodes at each node from said one or more hardware connected nodes;
  - in response to said each node, from said one or more hardware connected nodes, receiving the query for a first time, said each node retransmits the query from said each node to another one or more nodes from said one or more hardware connected nodes; and
  - the query is repeatedly received and retransmitted at other nodes from said one or more hardware connected nodes until the query is received at the hardware destination node;

wherein the query includes an encryption token, and wherein each node that receives the query performs an attempt to decrypt the encryption token, and wherein each node that is unable to perform the attempt is designated as one of the untrusted hardware nodes and is required to apply a delay prior to retransmitting the query in response to the decryption attempt failing.

6. The system according to claim 5, wherein no delay occurs when retransmitting the query through trusted nodes that contain an encryption key for decrypting an encryption token that accompanies the query.

7. The system according to claim 5, wherein the system is further configured to transmit a reply to the query from the hardware destination node, the reply including routing information defining a route of the query from the hardware querying node to the hardware destination node.

8. The system according to claim 5, wherein a delay applied to retransmitting the query to one or more hardware connected nodes from a node designated as a delay node comprises an integer multiple of a normal transmission time between hardware connected nodes.

9. A computer program product for propagating a query from a querying node to a destination node in a network of connected nodes, wherein the query includes an encryption token, wherein at least one node is designated as a delay node, wherein the network of connected nodes is a network of hardware nodes, the computer program product comprising a non-transitory computer readable storage medium having program code embodied therewith, the program code readable and executable by a processor to perform a method comprising:
- transmitting the query from the querying node to one or more connected nodes in the network of connected nodes, wherein certain nodes from the one or more connected nodes have been predetermined to be untrusted nodes;
- designating one or more nodes, from said one or more connected nodes, as delay nodes, wherein only untrusted nodes are designated as the delay nodes, and wherein said delay nodes apply delays to the query before retransmitting the query to other nodes from said one or more connected nodes;
- receiving the query from one or more of the delay nodes at each node from said one or more connected nodes;
- in response to said each node, from said one or more connected nodes, receiving the query for a first time, said each node retransmitting the query from said each node to another one or more nodes from said one or more connected nodes;
- attempting, by each node that receives the query, to decrypt the encryption token;
- designating each node that fails to decrypt the encryption token as one of the untrusted nodes that are required to apply a delay to the query prior to retransmitting the query to another node in the network of connected nodes; and
- repeatedly receiving and retransmitting the query at other nodes from said one or more connected nodes until the query is received at the destination node.

10. The computer program product of claim 9, wherein the method further comprises:
- preventing any delay in retransmitting the query through trusted nodes in the network of connected nodes that contain an encryption key for decrypting an encryption token that accompanies the query.

11. The computer program product according to claim 9, further comprising;
- transmitting a reply to the query from the destination node, the reply including routing information defining a route of the query from the querying node to the destination node.

12. The computer program product according to claim 9, wherein a delay applied to retransmitting the query to one or more connected nodes from a node designated as a delay node comprises an integer multiple of a normal transmission time between connected nodes.

* * * * *